Feb. 2, 1965 E. A. VOLK, JR 3,168,106
BALANCED PRESSURE REGULATOR
Filed June 26, 1962
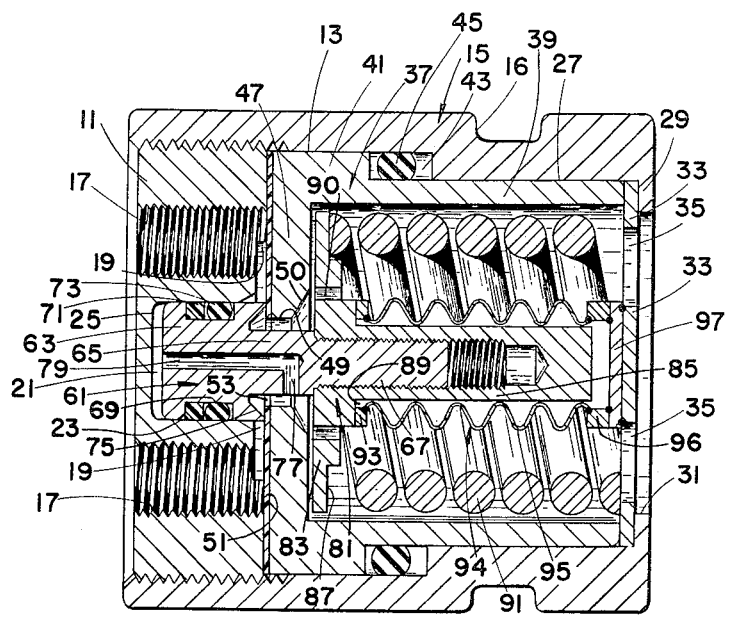
INVENTOR
EMIL A. VOLK, JR.
BY Robert W. Ely
ATTORNEY

United States Patent Office 3,168,106
Patented Feb. 2, 1965

3,168,106
BALANCED PRESSURE REGULATOR
Emil A. Volk, Jr., Whitesboro, N.Y., assignor to The Bendix Corporation, Utica, N.Y., a corporation of Delaware
Filed June 26, 1962, Ser. No. 205,321
3 Claims. (Cl. 137—505.18)

This invention relates to valves and more particularly concerns automatic pressure regulating valves for use with a container confining a high pressure gas, such as nitrogen.

An object of the present invention is to provide an improved pressure regulating valve which is compact and reliable and which is less expensive to manufacture.

Another object is to provide an improved pressure regulating valve wherein a valve-opening spring force operates against valve-closing force resulting from an arrangement of other structure giving a small, constant pressure force and a bellows.

An additional object is the provision of an axial-flow presure regulating valve for mounting in a container outlet bore in which a constant-pressure-unbalanced piston valve element having a pointed seating edge is adjusted relative to one side valve seat wall by the interaction of a bellows and spring, at the other side of the valve seat wall, associated with the piston valve element.

The realization of the above objects along with the advantages and features of the invention will be apparent from the following detailed description and the accompanying drawing.

The drawing is an enlarged, cross-sectional view through a pressure regulator incorporating the invention and shows a piston-valve element seated around an axial opening and a valve element extension connected to a bellows which is surrounded by a coil spring arranged to urge the regulator to open position.

Referring to the left side of the drawing, it can be seen that an inlet member 1 is threaded into the left or inlet bore 13 tubular valve housing 15. Housing 15 having cylindrical side surface is constructed to fit into a mating bore of container outlet and has an O ring groove 16 for a leak-preventing, O ring seal. Inlet member 11 has two threaded inlet passages 17 which extend axially and connect to a circular or annular recess 19 in member 11 to provide an axial-radial inlet flow path. Passages 17 are threaded to provide for insertion and removal of inlet disc 11. The recess 19 terminates at the edge of an axial piston cavity 21 in the inlet member 11. Cavity 21 has axial cylindrical side wall 23 and a transverse bottom wall 25.

The valve housing 15 has at the right an outlet bore 27 which extends from inlet bore 13 to a radially-inwardly-extending support lip 29. The valve housing outlet 31 is provided by the circular edge of annular lip 29. A positioning plate 33 having four openings 35 (two appearing) abuts the inner surface of the lip 29 and the right or outlet end of the side wall of the tubular valve seat member 37 which has its small diameter part 39 slidably mounted in the outlet bore 27 and its large diameter part 41 slidably mounted in housing inlet bore 13.

Tubular part 39 has a greater length than housing outlet bore 27 so that a seal gap 43 is provided and in which a rubber O ring seal 45 is mounted. The valve seat member 37 has a transverse valve seat wall 47 which extends radially-inwardly and terminates in a circular axial opening 49. An outwardly-inclined or flared annular surface 50 in wall 47 extends downstream from opening 49. A thin nylon disc 51 is mounted on the inlet surface or side of valve seat wall 47 and has an opening 53 which corresponds to the wall axial opening 49. It is apparent that the threading-in of inlet member 11 for abutment against nylon disc 51 urges valve seat member 37 and support plate 33 against housing lip 29 for proper and secure positioning.

A piston valve element 61 is slidably mounted in cavity 21 and has piston part 63 and an axial cylindrical projection 65 which extends through opening 49 to form an annular flow path and has a terminal threaded part 67 of slightly-reduced diameter in the control chamber. The piston part 63 has an annular seal recess 69 in the side wall thereof which contains a split resilient plastic ring 71 and a rubber O ring 73 to provide a seal between the piston part 63 and the side wall 23 of cavity 21. At the right periphery of the piston part 63, a pointed circular edge 75 is formed for contact with, or adjustment relative to, the valve seat disc 51. The edge 75 has a very small, flat point (0.005″) and has an axial outer cylindrical side wall and an inclined inner surface. The downstream surface of the piston part 63 is formed by annular inclined surface and the transverse annular surface immediately around valve element extension 65. The valve extension 65 has a lateral passage 77 which opens radially at the location of the valve seat axial opening 49. Lateral passage 77 connects with an axial passage 79 formed in extension 65 and piston part 63 so that gas passes to the space between the cavity wall 25 and transverse inner wall of the piston part 63. It is to be noted that the downstream surface of the piston part 63 has a smaller area than the area of the inner wall of the piston part 63, outwardly of the opening of axial passage 79, whereby the net pressure force on the piston part 63 is to the right or toward closing position.

To the right of valve seat wall 47, a support member 81 is threaded on valve element extension 67 and has a flange 83 and axial part 85 which receives the extension 67 and projects to the right to adjacent support plate 33. The flange 83 has a peripheral recess 87 and an inner shoulder 89. At the outer edge of shoulder 89, a plurality of axially-extending ports 90 are provided in flange 83. Ports 90 open over the outer part of the flared exit 50 of axial opening 49. A heavy coil spring 91 is mounted at its left end in recess 87 and is confined at the other end by the outer part of support plate 33. An attachment ring 93 of a bellows assembly 94 is brazed to the shoulder 89 of flange 83. The corrugated bellows element 95 closely surrounds the axial part 85 of member 61 and extends to the right where it is connected to a support ring 96 brazed to transverse seal cover 97. Cover 97 is brazed to support plate 33.

In operation, the pressure regulator is mounted by conventional means in a tubular outlet bore of a high pressure nitrogen cylinder or container with an O ring in groove 16 providing a seal. In a typical installation, the nitrogen is pumped into the container and would be at three thousand p.s.i.g. The reduced, regulated pressure desired would be about twelve hundred p.s.i.g. Spring 91 normally holds the regulator open before installation. Upon the opening of an on-off control valve downstream of the regulator, the high pressure nitrogen passes through axially-extending passages 17 in inlet member 11 and radially-extending annular recess 19 and then past the circular, pointed edge 75 of the piston valve part 63 to axial opening 49, ports 90, and outlet 31. At circular edge 75, a pressure reduction results. When the pressure exceeds the desired predetermined value, bellows assembly 94 will overcome spring 91 and move the circular edge 75 toward the nylon-covered valve seat 47. At a slight decrease in pressure downstream of edge 75, the coil spring 91 will move edge 75 away from the valve seat 47 providing less pressure reduction past edge 75. This adjustment will continue until the downstream control valve is closed. It is to be noted that, by having the sharp edge 75 as a projection from the cylindrical side wall of valve piston 63, the variable high pressure does not act on the valve piston 63 to produce an axial force of large and varying magnitude. Also, the reduced pressure acting on the back of the piston valve 63 results only in a small constant pressure unbalance tending to close the valve since the piston surface outward of a diameter corresponding to the valve element extension 65 is offset by the downstream valve piston surface between the pointed edge 75 and the extension 65 which is also subject to the reduced regulated pressure. Sealing rings 71 and 73 assure that high pressures do not act on the back of the piston valve 63. When spring 91 tends to close the valve, the axial passage 79 and lateral passage 77 serve as a bleed-off to prevent compression back of the piston valve 63. With a varyingly-positioned circle edge 75, the reduced pressure flow moves from axial opening 49 through ports 90 and laterally between the valve seat wall 47 and the flange 83, over the periphery of the flange. A combined flow moves axially past spring 91 to openings 35 in support plate 33 and out through housing outlet 31.

It is to be noted that the arrangement provides a reliable compact axial-flow regulator in which the opposed action of the bellows and spring do not move a valve element which is subject to variable high pressures but which has a small constant pressure force urging the valve element toward closed position.

It is to be understood that persons skilled in the art can make changes in the disclosed embodiment without departing from the invention as defined in the appended claims.

What is claimed is:

1. A pressure regulating valve for high pressure gas from a container having an outlet bore comprised of:
   tubular housing means having an inlet end and an outlet end with axial outlet,
   valve seat means having a transversely-extending wall terminating in an axially-centered opening and providing an annular valve seat around said opening,
   a transversely-extending inlet member including an axial cavity facing said annular valve seat and having a diameter larger than said axially-centered opening,
   said inlet member having circular recess extending radially outward from said cavity and having axial passages connecting to said circular recess whereby an axial-radial flow path to said valve seat opening is provided,
   a cylindrical valve element slidably mounted in said cavity and having a pointed circular peripheral edge extending toward the facing surface of said valve seat,
   a nylon sheet covering the facing surface of said valve seat at the location opposite said circular pointed edge of said valve element,
   said valve element having an axial cylindrical extension radially-inwardly of said circular edge which projects through said valve seat opening to provide an annular flow path,
   said valve element having a lateral passage opening into said annular flow path and an axial passage connected to said lateral passage to provide a balancing-bleed flow path from said annular flow path to the space defined by said cavity and said valve element,
   control means including a bellows and a spring connected to said valve element extension,
   said control means and said housing means providing a flow path from said axial opening to said housing axial outlet,
   said spring normally urging said circular edge away from said valve seat,
   said bellows when subject to a predetermined downstream pressure being constructed to move said valve element toward said valve seat to provide a predetermined downstream pressure.

2. A pressure regulating valve for high pressure gas from a container comprised of:
   a tubular valve housing having an inlet end and an outlet bore,
   outlet means in said outlet bore providing transverse outlet wall having axially-extending outlets,
   said inlet end having inlet bore which has its axially-outward part threaded,
   a tubular valve seat member having a cylindrical outlet end and an inlet end which has a radially-inwardly-projecting valve seat wall terminating in an axially-centered opening,
   said tubular valve seat member being slidably positioned in said housing outlet bore with its outlet end abutting said transverse outlet wall,
   an inlet member threaded in the inlet bore of said housing and abutting said valve seat member,
   said inlet member including an axial cavity facing said seat shoulder and having a diameter larger than said axially-centered opening,
   said inlet member having an annular recess extending radially outward from said cavity and having axially-extending passages connecting to said circular recess whereby an axial-radial flow path to said valve seat opening is provided,
   a cylindrical valve element slidably mounted in said cavity and having a pointed circular peripheral edge extending toward the facing surface of said valve seat and having peripheral sealing rings contacting said cavity,
   a nylon sheet covering the facing surface of said valve seat at the location opposite said circular pointed edge of said valve element,
   said valve element having an axial cylindrical extension radially-inwardly of said circular edge which projects through said valve seat opening to provide an annular flow path,
   said valve element having a lateral passage opening into said annular flow path and an axial passage connected to said lateral passage to provide a balancing-bleed flow path from said annular flow path to the space defined by said cavity and said valve element,
   a bellows assembly connected to said valve element extension and to said outlet wall,
   a spring surrounding said bellows assembly and confined between said valve extension and said outlet wall,
   said spring normally urging said circular edge away from said nylon valve seat,
   said bellows assembly when subject to a predetermined downstream pressure being constructed to move said valve element toward said valve seat to provide a predetermined downstream pressure,
   said valve element being constructed so that it is urged toward said valve seat under flow conditions by the constant relatively-small net force of reduced pressure gas acting on the surfaces radially outward of said extension and on the cavity surface radially-outward of said axial passage whereby said bellows assembly and said spring operate in relation to a constant force on said valve element.

3. A pressure regulating valve for high pressure gas from a container comprised of:
   a tubular valve housing having an inlet end and an outlet end and cylindrical surface with an O-ring recess,
   said outlet end having a radially-inwardly-projecting lip and axially-inward thereof an outlet bore,
   said inlet end having inlet bore which has its axially-outward part threaded,
   a positioning plate having a peripheral ring part and a center part with openings between said ring part and said center part, a tubular valve seat member having a cylindrical outlet end and an inlet end which has a radially-inwardly-projecting valve seat wall terminating in an axially-centered opening, said opening having an outwardly-flared downstream outlet, said tubular valve seat member being slidably positioned in said housing outlet bore with its outlet end abutting said plate, an inlet member threaded in the inlet bore of said housing and abutting said valve seat member, said inlet member including an axial cavity facing said seat shoulder and having a diameter larger than said axially-centered opening.

said inlet member having an annular recess extending radially outward from said cavity and having axially-extending passages connecting to said circular recess whereby an axial-radial flow path to said valve seat opening is provided, a cylindrical valve element slidably mounted in said cavity and having a pointed circular peripheral edge extending toward the facing surface of said valve seat and having peripheral sealing rings contacting said cavity, a nylon sheet covering the facing surface of said valve seat at the location opposite said circular pointed edge of said valve element, said valve element having an axial cylindrical extension radially-inwardly of said circular edge which projects through said valve seat opening to provide an annular flow path, said valve element having a lateral passage opening into said annular flow path and an axial passage connected to said lateral passage to provide a balancing-bleed flow path from said annular flow path to the space defined by said cavity and said valve element, said valve element extension having a radially-extending support flange mounted thereon with the outer part of the flange spaced from the side wall of said tubular valve seat, a bellows assembly connected to the radially-inner part of said support flange and abutting the center part of said support plate, a spring surrounding said bellows assembly and confined between said support flange and said support plate, said support flange having ports therethrough outwardly of said bellows assembly communicating with the flared outlet of said axial opening, said spring normally urging said circular edge away from said nylon valve seat, said bellows assembly when subject to a predetermined downstream pressure being constructed to move said valve element toward said valve seat to provide a predetermined downstream pressure.

References Cited in the file of this patent

UNITED STATES PATENTS

| | | |
|---|---|---|
| 1,525,426 | Mueller | Feb. 3, 1925 |
| 2,702,048 | Coffey | Feb. 15, 1955 |
| 2,730,269 | Earle | Jan. 10, 1956 |
| 2,777,458 | Stern | Jan. 15, 1957 |
| 2,918,930 | Jansen | Dec. 29, 1959 |
| 2,920,859 | Holmes | Jan. 12, 1960 |
| 3,064,670 | Peras | Nov. 20, 1962 |

FOREIGN PATENTS

| | | |
|---|---|---|
| 846,106 | Great Britain | Aug. 24, 1960 |
| 1,108,998 | Germany | June 15, 1961 |